United States Patent
Sado et al.

(10) Patent No.: US 7,423,835 B2
(45) Date of Patent: Sep. 9, 2008

(54) METHOD AND APPARATUS FOR SERVO CONTROL USING SPIRAL SERVO INFORMATION IN A DISK DRIVE

(75) Inventors: Hideo Sado, Ome (JP); Masahide Yatsu, Akishima (JP); Masafumi Iwashiro, Ome (JP); Shouji Nakajima, Kodaira (JP); Seiji Mizukoshi, Nishitama-gun (JP); Shinichiro Kouhara, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/590,758

(22) Filed: Nov. 1, 2006

(65) Prior Publication Data

US 2007/0097539 A1 May 3, 2007

(30) Foreign Application Priority Data

Nov. 1, 2005 (JP) ............................. 2005-318506

(51) Int. Cl.
*G11B 5/596* (2006.01)

(52) U.S. Cl. .................................. 360/77.05
(58) Field of Classification Search ....................... None
See application file for complete search history.

(56) References Cited

U.S. PATENT DOCUMENTS 7,019,937 B1 * 3/2006 Liikanen et al. .......... 360/77.11
7,230,786 B1 * 6/2007 Ray et al. ..................... 360/75

FOREIGN PATENT DOCUMENTS

| JP | 63-056884 | 3/1988 |
|---|---|---|
| JP | 09-167457 | 6/1997 |
| JP | 2005-032350 | 2/2005 |

* cited by examiner

*Primary Examiner*—K. Wong
(74) *Attorney, Agent, or Firm*—Pillsbury Winthrop Shaw Pittman, LLP

(57) ABSTRACT

According to one embodiment, in a disk drive using a disk medium storing spiral servo information, a CPU generates virtual servo information having assumed virtual track centers corresponding to centers of concentric data tracks. The CPU performs control to position a head to the center of the concentric data track by using the virtual servo information.

10 Claims, 11 Drawing Sheets

METHOD AND APPARATUS FOR SERVO CONTROL USING SPIRAL SERVO INFORMATION IN A DISK DRIVE

CROSS-REFERENCE TO RELATED APPLICATIONS

This application is based upon and claims the benefit of priority from Japanese Patent Application No. 2005-318506, filed Nov. 1, 2005, the entire contents of which are incorporated herein by reference.

BACKGROUND

1. Field

One embodiment of the invention relates to a disk drive using a disk medium storing servo information and, in particular, a head positioning control technique using spiral servo information.

2. Description of the Related Art

Generally, in disk drives typified by hard disk drives, servo information used for control of positioning the head (servo control) is recorded on a disk medium being a data recording medium. In disk drives, the head is positioned to a target position (target track) on the disk medium, using the servo information read by the head.

The head performs writing of data or reading of data in the target position. Generally, the head is separated into a read head and a write head, and the read head reads data (including servo information), and the write head writes data.

The servo information recorded on the disk medium is generally recorded on servo sectors, which are circumferentially arranged at regular intervals, and the servo sectors form concentric servo tracks. In disk drives, the head positioned on the basis of servo information records user data in concentric data tracks formed on a disk medium.

In the meantime, proposed is a disk drive using a disk medium recording spiral servo information, not concentric servo information, in manufacturing process of disk drives to improve the efficiency of a servo writing step of recording servo information on a disk medium (for example, refer to Jpn. Pat. Appln. KOKAI Pub. No. 2005-32350). In this technique, the efficiency of the servo writing step is improved in comparison with the case of using concentric servo information, because writing spiral servo information requires no head stop time, and thus servo information is written on the whole surface of a disk medium for a relatively short time.

On the other hand, in commercialized disk drives, it is required to write user data (computer data and stream data such as images) in a concentric data track on a disk medium. This is because concentric data tracks have higher random access efficiency than that of spiral tracks.

However, when servo information is read from a spiral servo track and positioning of the head is performed with respect to a concentric data track, the track center line of the servo track is shifted from that of the data track, and without any measures the head positioning accuracy deteriorates. Therefore, the efficiency of positioning control operation deteriorates, and consequently random access performance to concentric data tracks deteriorates.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a disk drive comprises: a disk medium having a disk surface on which a plurality of servo sectors are arranged at regular intervals and concentric data tracks are formed, the servo sectors forming a spiral servo track and storing servo information, the concentric data tracks storing user data; a head which reads the servo information and reads/writes the user data on the disk medium; and a controller which performs positioning control of the head based on the servo information read by the head, the controller generating virtual servo information having assumed virtual track center lines corresponding to center lines of the data tracks based on the servo information, and positioning the head to a target data track based on the virtual servo information.

An embodiment of the present invention is explained with reference to drawings.

(Structure of Disk Drive)

Figure 1:
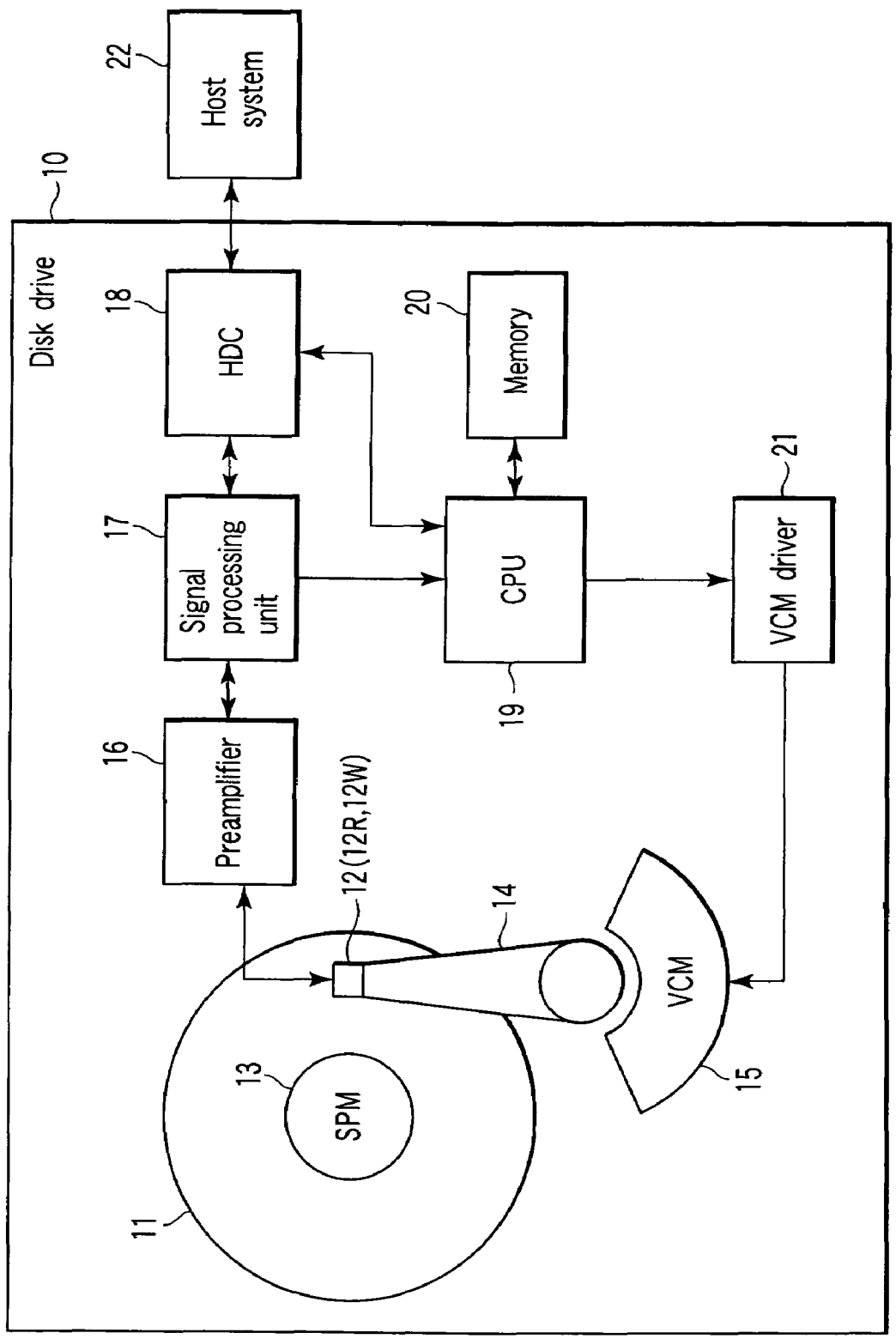
FIG. 1 is a block diagram illustrating a main part of a disk drive according to an embodiment of the present invention.

FIG. 1 is a block diagram illustrating a structure of a disk drive according to the embodiment.

A disk drive 10 of the embodiment is a hard disk drive using a disk medium 11 as a magnetic recording medium. The disk medium 11 stores servo information defining a spiral servo track, as described below. The disk medium 11 is incorporated in the disk drive 10, such that the disk medium 11 is secured on a spindle motor (SPM) 13 and rotated at high speed.

In the meantime, the disk drive 10 has a head 12 including a read head 12R that reads data (servo information and user data) from the disk medium 11, and a write head 12W that writes data in the disk medium 11. The head 12 is mounted on an actuator 14 that is driven by a voice coil motor (VCM) 15. A VCM driver 21 drives and controls the VCM 15 by supplying a drive current to the VCM 15. The actuator 14 is a head moving mechanism to position the head 12 to a target portion (target track) on the disk medium 11. The actuator 14 is driven and controlled by a microprocessor (CPU) 19 described below.

In addition to the head disk assembly described above, the disk drive 10 has a preamplifier circuit 16, a signal processing unit 17, a disk controller (HDC) 18, and the CPU 19, and a memory 20.

The preamplifier circuit 16 has a read amplifier that amplifies a read data signal output from the read head of the head 12, and a write amplifier that supplies a write data signal to the write head. Specifically, the write amplifier converts a write data signal output from the signal processing circuit into a write current signal, and sends the signal to the write head.

The signal processing unit 17 is a signal processing circuit that processes read/write data signals (including servo signals corresponding to the servo information), and is also referred to as read/write channel. The signal processing unit 17 includes a servo decoder that reproduces servo information from a servo signal, as described below.

The HDC 18 has a function of an interface between 4 the drive 10 and the host system 22 (such as personal computers and various digital apparatuses). The HDC 18 controls transfer of read/write data between the disk 11 and the host system 22.

The CPU 10 is a main controller of the drive 10, and performs the head positioning control according to the embodiment, and general read/write operation control of the user data. The memory 20 includes a RAM and a ROM besides a flash memory (EEPROM) being a nonvolatile memory, and stores various data and programs necessary for control of the CPU 19.

(Structure of Disk Medium)

Figure 2:
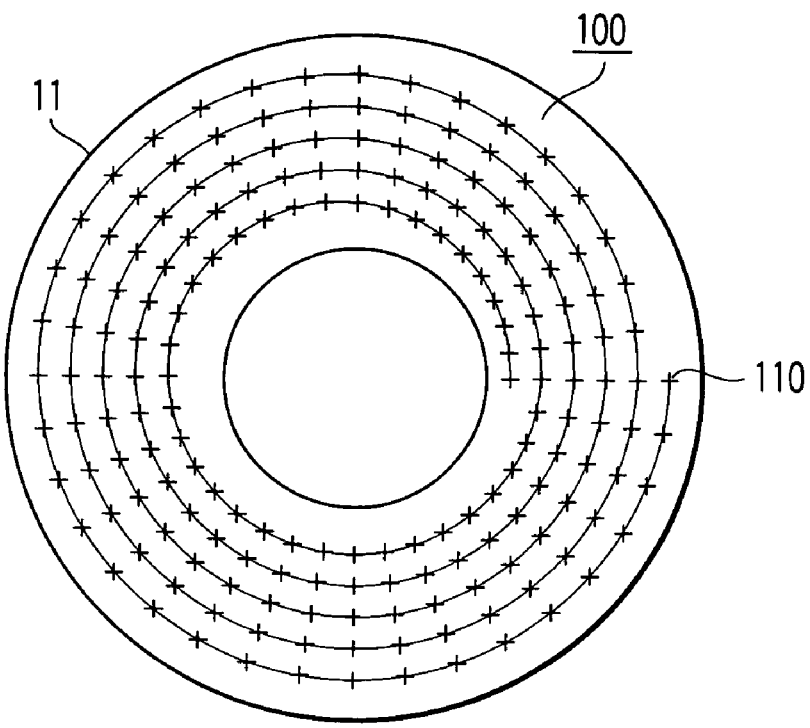
FIG. 2 is a diagram illustrating a servo track on a disk medium according to the embodiment.
Figure 3:
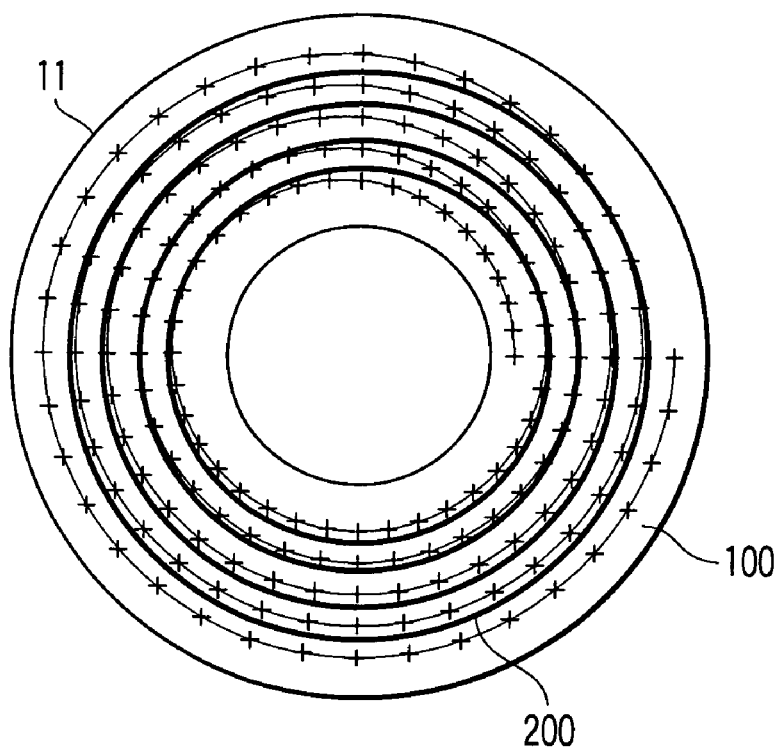
FIG. 3 is a diagram illustrating a data track on a disk medium according to the embodiment.

FIGS. 2 and 3 are diagrams illustrating a structure of the disk medium 11 according to the embodiment.

FIG. 2 is a diagram illustrating a recording state of servo information defining a spiral servo track (servo pattern) recorded on the disk medium 11 according to the embodiment. The servo information is recorded on servo sectors (denoted by "+" marks) arranged at regular intervals in a circumferential direction. The servo sectors 110 are configured to be radially arranged in a radial direction of the disk medium 11. On the other hand, the servo sectors 110 are configured to define a spiral servo track 100 when their central lines (track centers) are connected with respective adjacent servo sectors. In short, adjacent servo information items are written in radially shifted positions.

FIG. 3 illustrates a state where a plurality of concentric data tracks 200 are formed on the disk medium 11 in which the spiral servo information (servo track 100) is written. Each data track 200 is formed of a plurality of data sectors arranged between the servo sectors. In the embodiment, track centers (central lines) TC of the data tracks 200 do not agree with the track center (central line) SC of the servo track.

Figure 4:
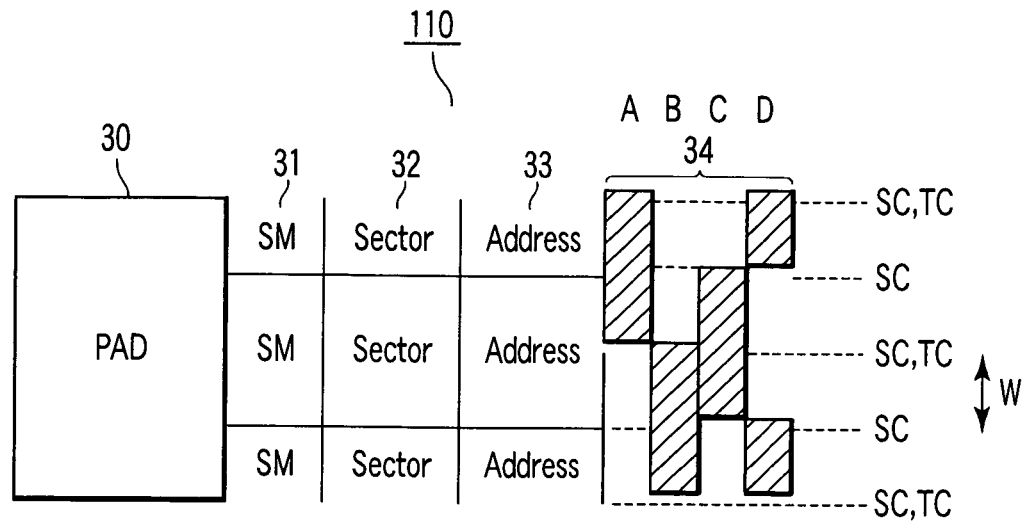
FIG. 4 is a diagram illustrating a structure of servo information recorded on servo sectors of the embodiment.

FIG. 4 is a diagram illustrating a structure of a servo information item recorded on the servo sectors 110.

The servo information item comprises a pad (PAD) unit 30, a servo mark (SM) unit 31, a sector unit 32, an address unit 33, and a servo burst pattern unit 34. In FIG. 4, the mark W indicates a length corresponding to half of the data track width.

The pad unit 30 includes a gap and a synchronizing signal region called servo AGC. The servo mark unit 31 is a signal region for identifying the servo sector. The sector unit 32 is a recording region for a sector code for identifying the servo sector 110. The address unit 33 is a recording region for a track code (cylinder code) for identifying the track (cylinder). The servo burst pattern unit 34 is a region in which servo burst patterns A to D are recorded to detect the position of the head 12 in the servo track.

Supposing that each boundary between the servo burst patterns A to D is a servo center SC, a servo center SC corresponding to the boundary between the servo burst patterns A and B is referred to as a track center (central line) SC of the servo track.

FIG. 4 illustrates a state where the track centers SC of the servo track identified by the cylinder code agree with the respective track centers TC of the data tracks 200.

Figure 5:
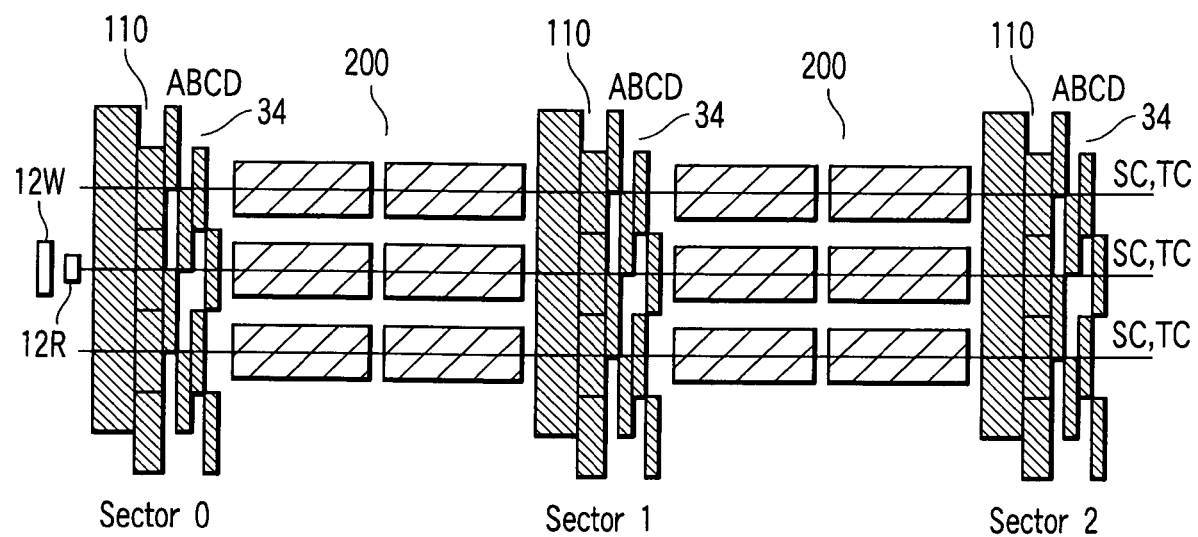
FIG. 5 is a diagram for explaining a difference between the servo information of the embodiment and concentric servo information.

FIG. 5 is a diagram illustrating the case where servo information which is concentrically formed is recorded on a disk medium. Specifically, the servo center (track center of the servo track) SC corresponding to the boundary between the servo burst patterns A and B is located in the same radial position in each of the servo sectors. The track centers SC of the servo track agree with respective centers TC of the data tracks 200.

In the disk drive, the write head 12W records user data on the data tracks 200, in the state where the read head 12R is positioned to the track center SC of the servo track.

Figure 6:
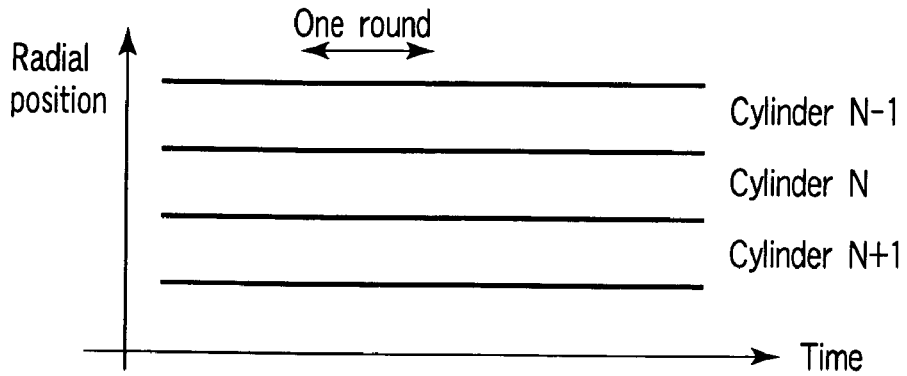
FIG. 6 is a diagram for explaining a difference between the servo information of the embodiment and the concentric servo information.

FIG. 6 is a schematic diagram of FIG. 5, and illustrates cylinder codes (cylinder numbers of the address unit 33) read from a head position at a certain time. Specifically, the read head 12R always reads the same cylinder code from the same radial position.

(Servo Writing Process)

Figure 11:
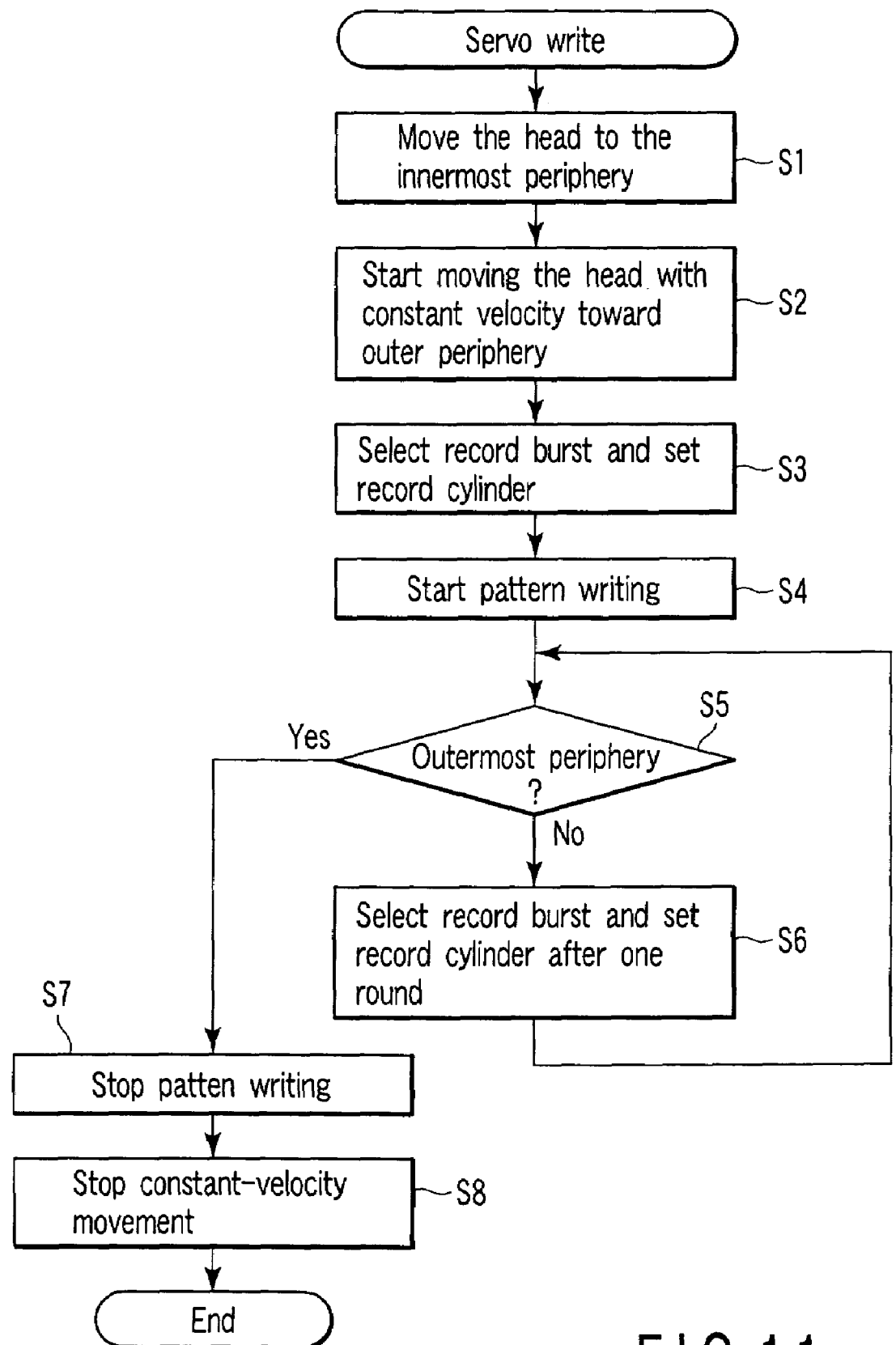
FIG. 11 is a flowchart illustrating a writing process of the servo information of the embodiment.

Next, explained is a servo writing process to record spiral servo information of the embodiment on the disk medium 11, with reference to FIG. 11. In the embodiment, explained is a process using a self servo writing method, in which servo information is written on the incorporated disk medium 11 in the disk drive 10.

First, when the disk medium 11 is incorporated in the spindle motor 13 of the disk drive 10, the CPU 19 starts a program to execute servo writing operation, which is stored in the memory 20, and starts servo information writing operation.

Specifically, the CPU 19 moves the head 12 to the innermost periphery of the disk medium 11 (step S1). Then, the CPU 19 starts moving the head 12 with constant velocity toward the outer periphery of the disk medium 11 (step S2). The CPU 19 sets servo burst patterns (A to D) and cylinder code to be recorded, and writes the servo patterns with servo sector 0 as a write start point (steps S3 and S4). Specifically, the CPU 19 writes servo burst pattern A by one round in the innermost periphery of the disk medium 11, writes servo burst pattern D by one round, writes servo pattern B by one round, and write servo pattern C by one round. The CPU 19 repeats this step while moving the head 12 with constant velocity toward the outer periphery without movement waiting time of the head 12 (steps S5 and S6).

Then, when the servo burst patterns (A to D) and the cylinder code to be recorded are written on almost the whole surface ranging from the innermost to the outermost peripheries of the disk medium 11, the CPU 19 stops the writing operation and the constant-velocity movement of the head (steps S7 and S8).

In this step, if first servo information is written on the disk medium 11, a dedicated servo information writing device adopting the magnetic transfer method may be used instead of the servo track writer. Further, the first servo information may be written by using a push-pin type servo track writer after the disk medium 11 is incorporated in the disk drive 10. The push-pin type servo track writer operates the head 12 in the disk drive 10, and thereby writes the first servo information on the disk medium 11.

By the above process, servo information is written in the servo sectors 110 to define the spiral servo track 100 as shown in FIG. 2. Specifically, the central lines of the servo sectors 100 are connected like a picture drawn with a single stroke of brush.

Figure 9:
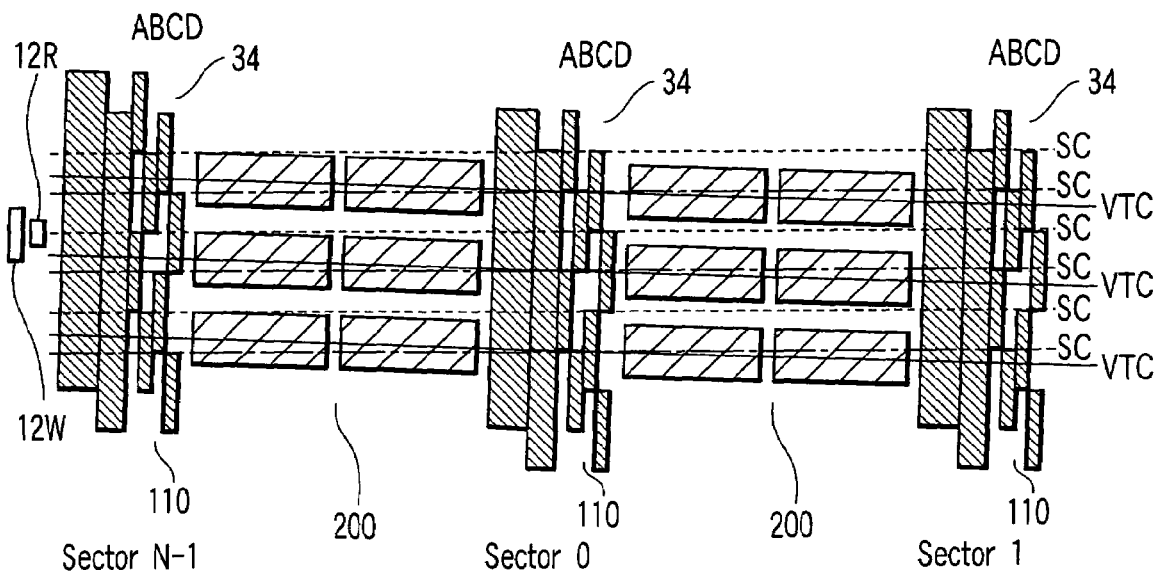
FIG. 9 is a diagram illustrating another state of the servo information of the embodiment.

However, as shown in FIG. 9, when servo information writing is started from the sector number 0 and writing for one round is ended to the sector number N−1, the servo information is recorded in a radial position shifted by 0.5 track. Specifically, in the spiral servo information, the radial positions of the centers SC of the servo track corresponding to the boundary between the servo burst patterns A and B do not agree with the respective centers (VTC described below) of the data tracks 200, but shifted by 0.5 track from the centers of the data tracks 200.

(Head Positioning Control)

Explained below is head positioning control if user data is read from and written in the concentric data tracks 200, using the spiral servo information according to the embodiment.

The disk drive 10 according to the embodiment performs head positioning control such that the head reads the servo information whose centers SC form a spiral shape, and writes user data in the concentric data tracks 200. Further, the head is required to read the user data from the concentric data tracks 200.

Figure 8:
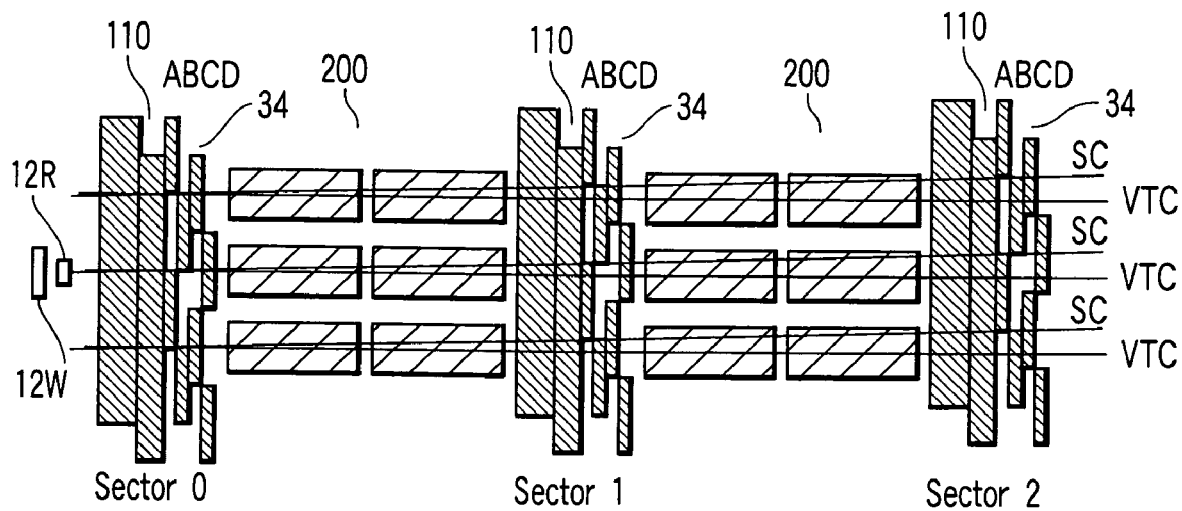
FIG. 8 is a diagram illustrating a state of the servo information of the embodiment.

Therefore, in the head positioning control of the embodiment, virtual track centers (virtual track central lines) VTC corresponding to the centers of the data tracks 200 are assumed, and the head 12 is positioned to the virtual track centers VTC (refer to FIGS. 8 and 9).

Figure 7:
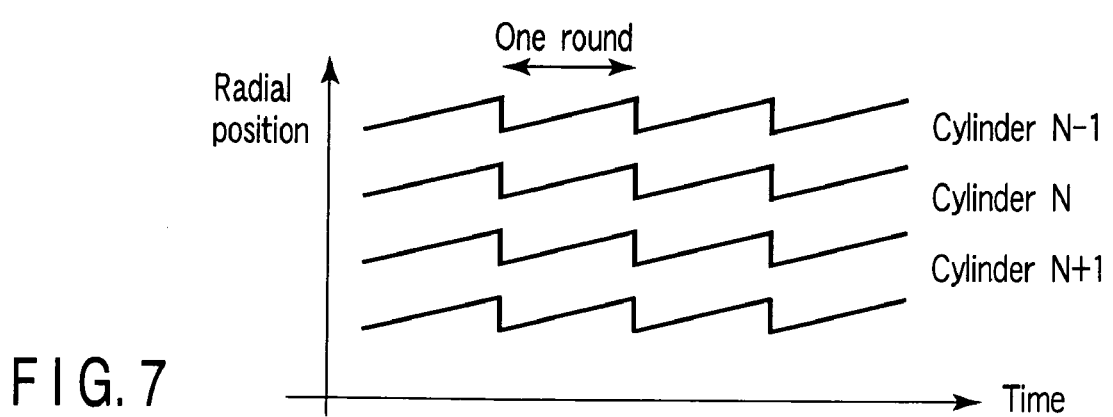
FIG. 7 is schematic diagram of the servo information of the embodiment.

FIG. 7 is a schematic diagram of FIGS. 8 and 9, and illustrates cylinder codes (cylinder numbers of the address unit 33) read from a head position at a certain time. Specifically, since the servo information is recorded in a spiral shape, the read head 12R may read different cylinder codes from the same radial position.

Figure 12:
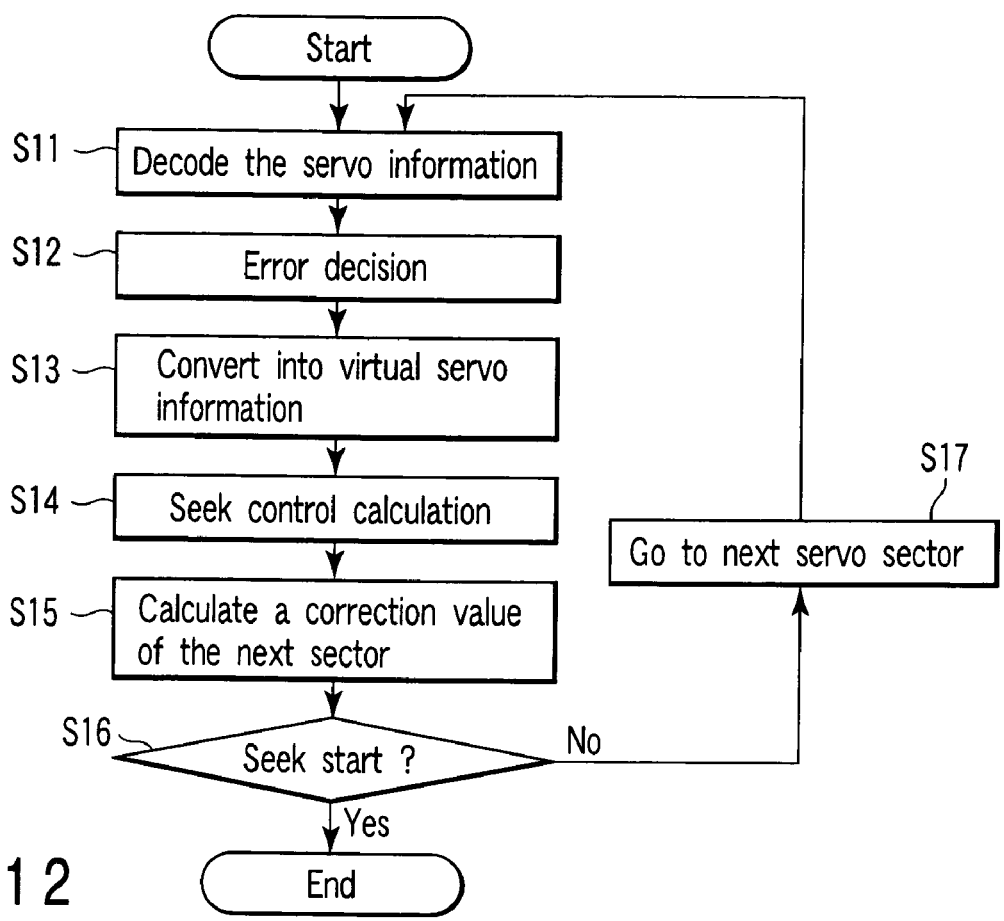
FIG. 12 is a flowchart illustrating a head positioning control process of the embodiment.

Next, explained is a process of performing track-following operation in the head positioning control, with reference to FIG. 12.

In the disk drive 10, the CPU 19 identifies the target data track 200 by reading the servo information with the read head 12R, and positions the read head 12R or the write head 12W to the center of the target data track 200.

Specifically, the read head 12R reads the servo information from the servo sectors 110. The signal processing unit 17 reproduces the cylinder code and the servo burst patterns (A to D) from a servo signal from the read head 12R (step S11).

In this process, as described below, the CPU 19 performs error decision of the cylinder code obtained from the signal processing unit 17 (step S12). Next, the CPU 19 converts the servo burst patterns (A to D) in the servo information read from the servo sector 110 into corrected virtual servo information, on the basis of the virtual track center VCT (step S13).

By using the virtual servo information, the CPU 19 positions the read head 12R to the virtual track center VCT, and reads the cylinder code. Further, the CPU 19 performs seek control calculation based on the cylinder code, that is, calculates a current value of the VCM 15 to position the head to the center of the target data track of the target cylinder code (step S14). The CPU 19 performs this process for each servo sector while the disk medium 11 is rotated by one round (steps S15, S16, S17).

In short, the CPU 19 generates virtual servo information based on the virtual track center VCT, and performs tracking operation by the read head 12R by using the virtual servo information (corrected servo burst patterns A and B). The CPU 19 performs seek operation to position the head 12 to the center of the target data track, by using the cylinder code read by the positioned read head 12R.

(Method of Reproducing Cylinder Code)

Figure 10:
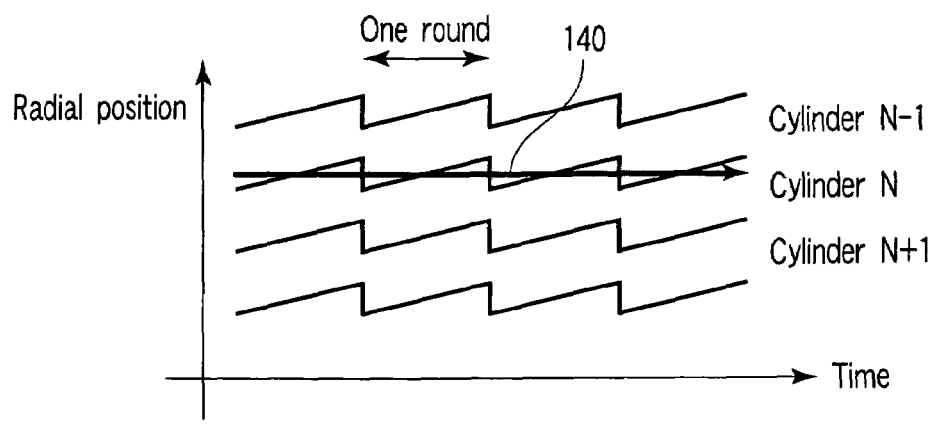
FIG. 10 is a diagram illustrating a method of reproducing a cylinder code of the embodiment.

FIG. 10 is a diagram illustrating a state where a cylinder code is read from a servo sector (sector number k). As shown in FIG. 10, when the read head 12R is positioned in a circumferential direction denoted by an arrow 140, the cylinder number read by the read head 12R is increased from N−1 to N.

Supposing that the cylinder code (address) in a servo sector (sector number k) is CYL (k), the following equations (1) and (2) are established on the basis of the track position x and a correction value thereof x_crct.

$$CYL(k) = \text{round}(x + x\_crct) \quad (1)$$

where round is an operator indicating rounding off the number.

$$x\_crct = 0.5 * k/n \quad (2)$$

where n represents the servo sector number.

Figure 16:
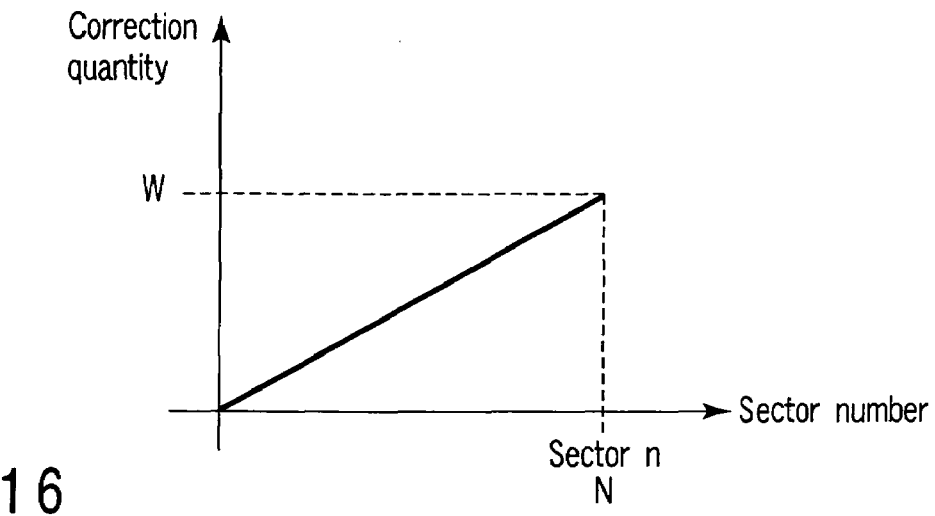
FIG. 16 is a diagram illustrating a method of reproducing the cylinder code of the embodiment.

The characteristic of x_crct is illustrated in FIG. 16.

Figure 13:
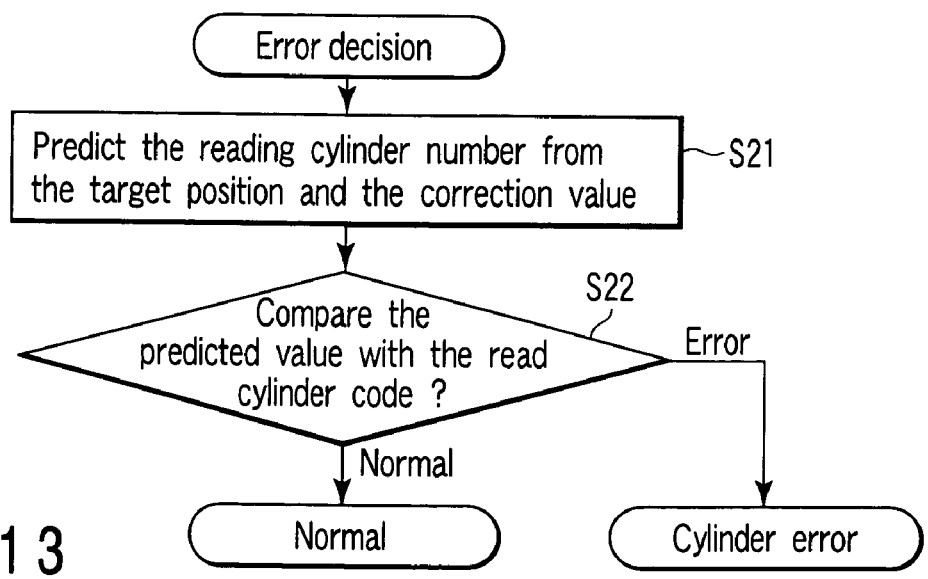
FIG. 13 is a flowchart illustrating error decision processing in the head positioning control of the embodiment.

FIG. 13 is a flowchart illustrating a specific process of the error decision performed in step S12 of FIG. 12. Specifically, the CPU 19 calculates a reading cylinder code predicted value in each servo sector, on the basis of the target cylinder code set by the host system 22 and the correction value (x_crct) represented by the above equation (2) (step S21).

The CPU 19 compares the cylinder code predicted value with the cylinder code actually read by the read head 12R and, if they agree with each other, the CPU 19 determines that the cylinder code is normal (step S22). If the actual cylinder code does not agree with the predicted value, the CPU 19 determines that the read cylinder code is an error.

Figure 14A:
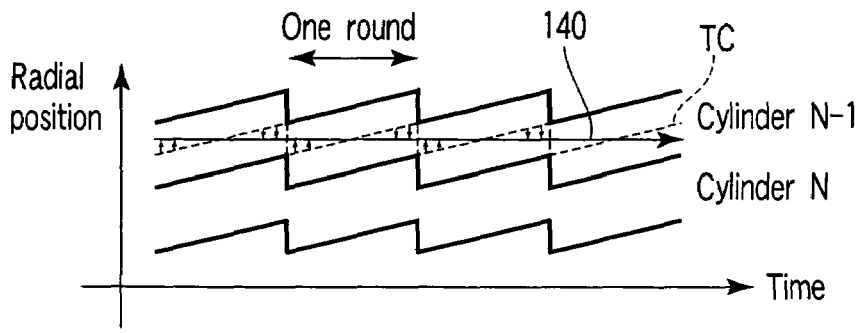
FIGS. 14A and 14B are diagrams illustrating virtual servo information of the embodiment.
Figure 14B:
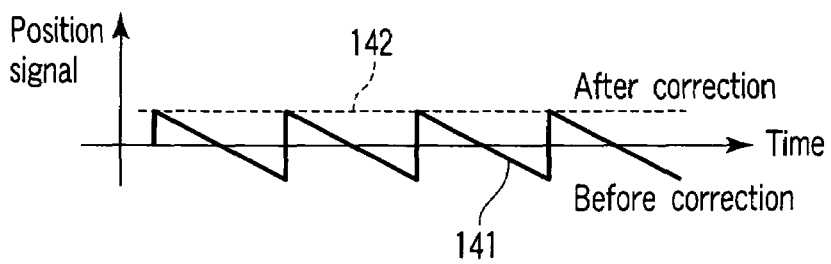
Figure 15:
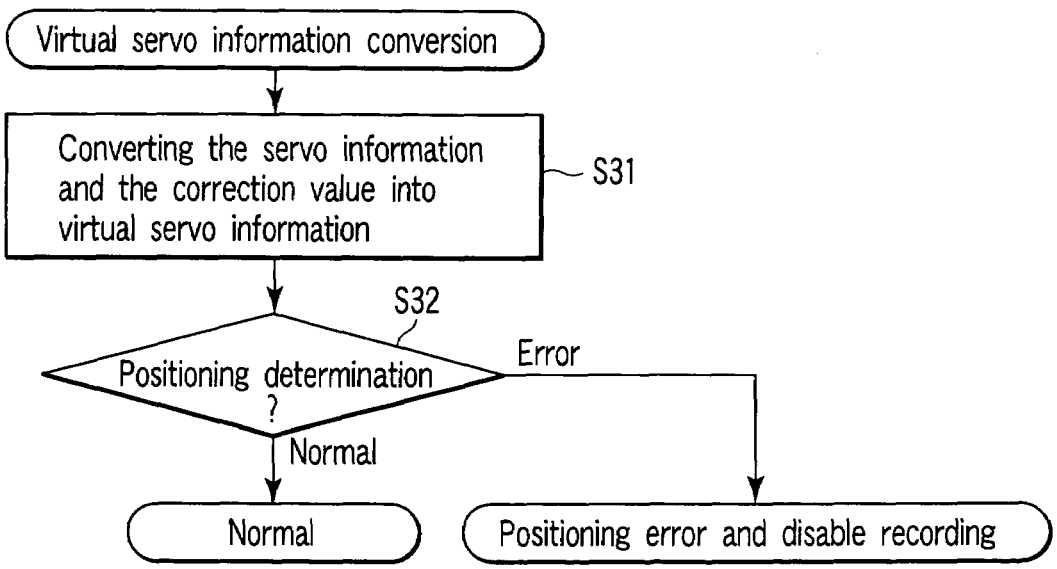
FIG. 15 is a flowchart illustrating positioning control using the virtual servo information of the embodiment.

FIGS. 14 and 15 are diagrams for specifically explaining the virtual servo information.

As described above, the CPU 19 calculates a position error with respect to the position of the boundary between the servo burst patterns A and B, on the basis of the servo burst patterns A and B read by the read head 12R. In the embodiment, since the servo information is arranged in a spiral form, the calculated position error quantity xs has a saw tooth waveform 141 as shown in FIG. 14(B).

As shown in FIG. 14(A), when the read head 12R is positioned to the center TC of the concentric data track in the direction of the arrow 140 with respect to the servo burst patterns A and B arranged in a spiral form, the position error quantity xs is represented by the following equation (3).

$$xs = xr - 0.5 * k/n \quad (3)$$

where xr represents position information based on the servo burst patterns A and B.

Specifically, in the case of using the servo information written in a spiral form, the position error quantity xs varies among the servo sectors.

Therefore, to position the head to the center of the concentric data track, the CPU 19 calculates virtual servo information (position error quantity) having a fixed value (142) as shown in FIG. 14(B).

The virtual servo information xi is expressed by the following equation (4).

$$xi = xs + x\_crct \quad (4)$$

Specifically, as shown in FIG. 15, the CPU 19 calculates a position error quantity with respect to the center of the concentric data track, using the position error quantity xs and the correction value calculated on the basis of the servo burst patterns A and B arranged in a spiral manner (step S31). In other words, the virtual servo information xi is information to convert the track center TC of a servo sector to the virtual track center VTC.

On the basis of the virtual servo information xi, the CPU 19 determines whether the head 12 is normally positioned to the center (VTC) of the concentric data track, with respect to the servo burst patterns arranged in a spiral manner (step S32). If the positioning of the head 12 is erroneous, the CPU 19 disables recording operation in particular for writing data.

Figure 17:
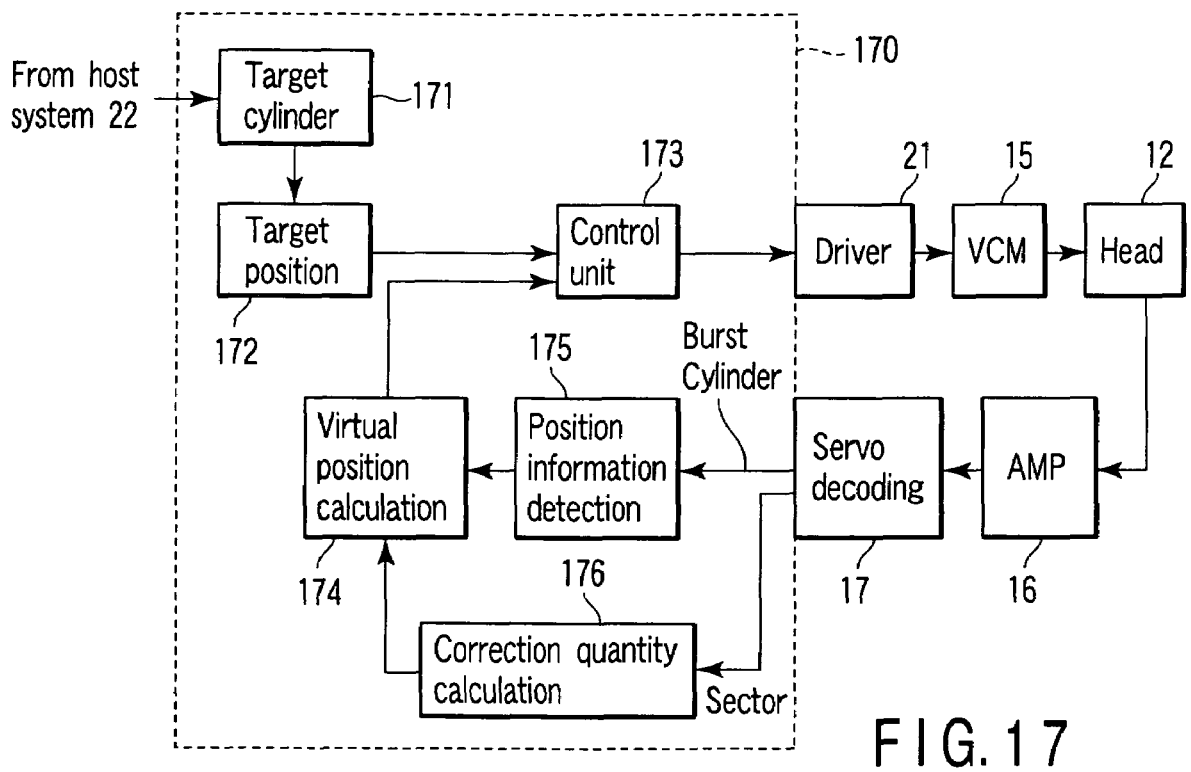
FIG. 17 is a block diagram illustrating a head positioning control system of the embodiment.

FIG. 17 is a block diagram illustrating a head positioning control system of the embodiment.

A control system 170 is specifically a control operation executed by the CPU 19.

In the control system 170, a position information detecting unit 175 detects spiral position information from the servo information (the cylinder code and the servo burst value) output from the servo decoder included in the signal processing unit 17. On the other hand, a correction quantity calculating unit 176 calculates a correction value for each servo sector. A virtual position calculating unit 174 calculates virtual servo information (virtual position information) xi on the basis of the position information of the saw tooth waveform and the correction value, as described above. A control unit 173 controls the driver 21 and executes positioning control of the head 12, on the basis of the difference between the target position based on the target cylinder value and the virtual position information.

Figure 18:
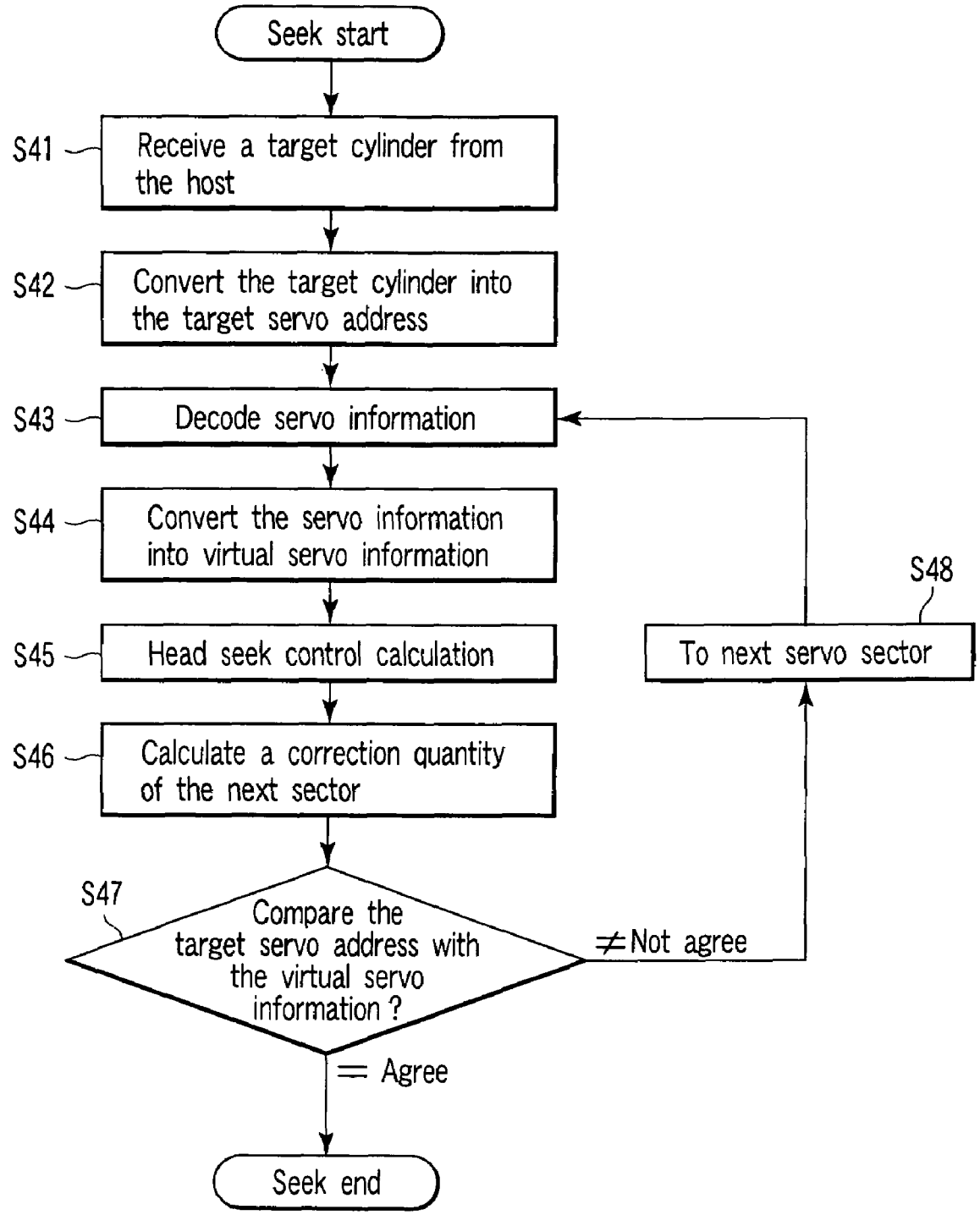
FIG. 18 is a flowchart illustrating a seek operation of the embodiment.

FIG. 18 is a flowchart illustrating a seek operation included in the head positioning control.

Specifically, when the CPU 19 receives a target cylinder (target track) from the host system 22, the CPU 19 converts the target cylinder into a target servo address (steps S41 and S42). On the other hand, spiral servo information read by the read head 12R is decoded by the servo decoder of the signal processing circuit 17 (step S43).

The CPU 19 converts the servo information of each servo sector into virtual servo information (generates virtual servo information from the servo information) (step S44). Further, the CPU 19 executes seek control calculation to position the head 12 to the center (VTC) of a concentric data track, on the basis of the virtual servo information (step S45).

The CPU 19 calculates a correction value at the next servo sector, and compares the servo address with the virtual servo information (steps S46, S47). If the address agrees with the virtual servo information as a result of comparison, the seek operation is ended by positioning the head 12 to the center (VTC) of the concentric data track being the target cylinder. On the other hand, if the address does not agree with the virtual servo information, the CPU 19 repeats the processing from the step of converting the servo information of the next servo sector into virtual servo information (step S48).

As described above, read/write operation of data to the concentric data track can be performed directly after the end of the seek operation, by performing the head movement control using the virtual servo information during the seek operation. Specifically, random seek operation for the concentric data tracks can be efficiently performed by using the spiral servo information.

Figure 19:
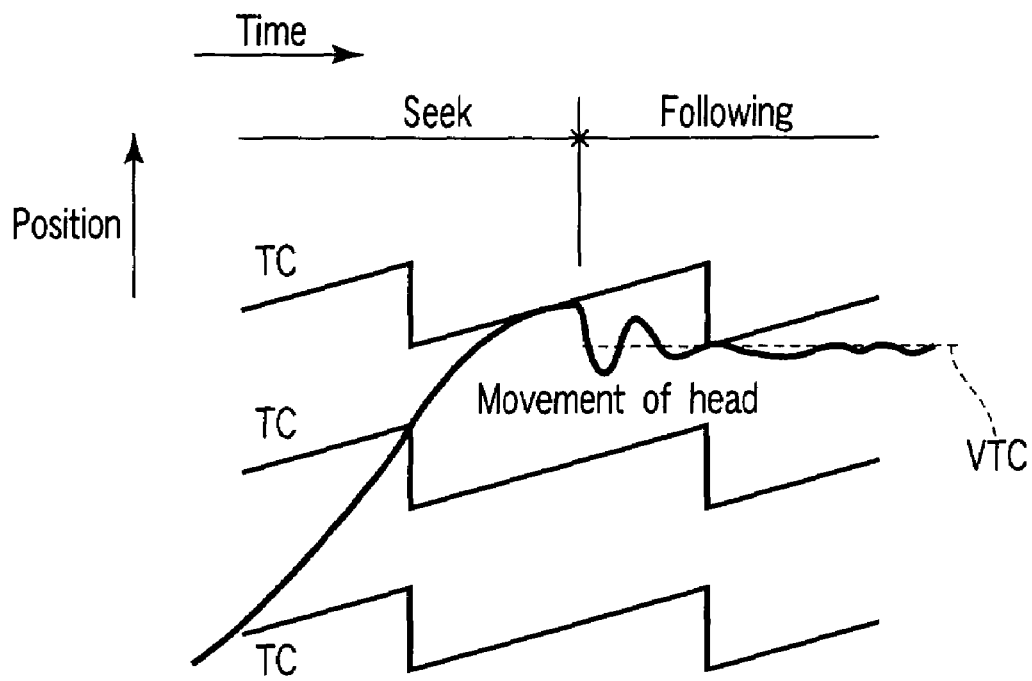
FIG. 19 is a diagram illustrating a seek operation without correction in the embodiment.

FIG. 19 is a diagram illustrating the case where the seek operation is performed without correction in the embodiment. Specifically, in common seek operation, when movement of the head 12 is controlled by using the spiral servo information, the head 12 is moved toward the track center TC. However, the position where the user data is recorded is the virtual track center VTC corresponding to the center of the concentric data track, and thus discontinuous transient occurs at the start of track following operation.

Figure 20:
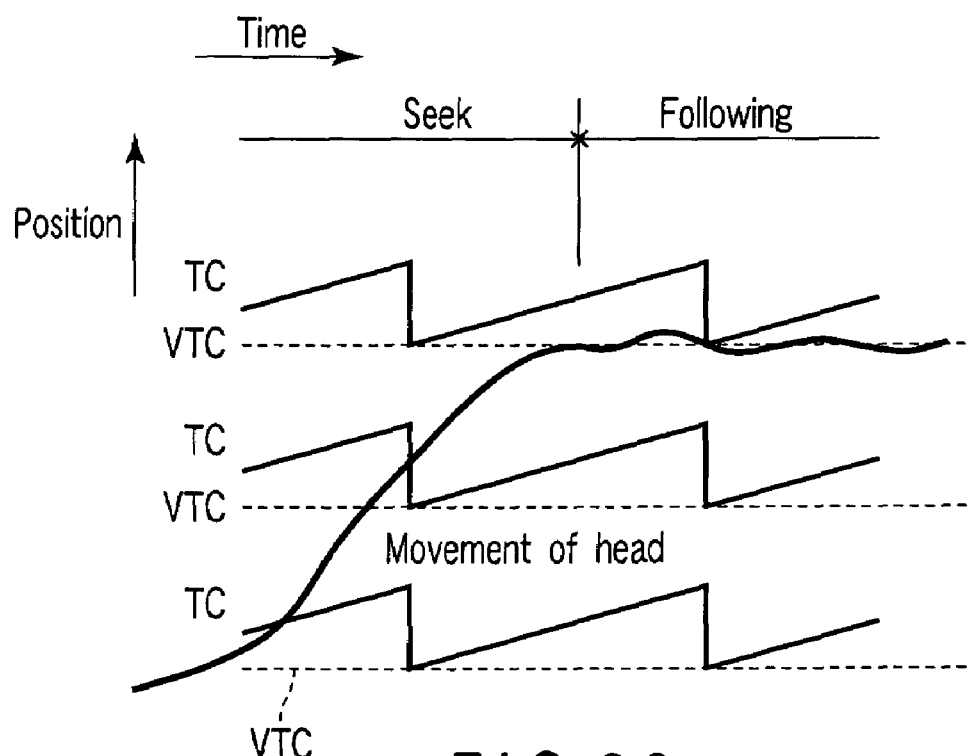
FIG. 20 is a diagram illustrating a seek operation with correction in the embodiment.

FIG. 20 is a diagram illustrating the case where the seek operation is performed with correction in the embodiment. Specifically, as shown in the flowchart of FIG. 18, in the seek operation of the embodiment, when movement of the head 12 is controlled by using the virtual servo information, the head 12 is moved toward the virtual track center VTC. Therefore, when the seek operation is ended, the head 12 is positioned to the center of the concentric data track, and no discontinuous transient occurs. Thus, it is possible to achieve the same random access operation as in the case of using concentric servo information.

As described above, the embodiment uses the virtual servo information having assumed virtual track centers VTC corresponding to the centers of concentric data tracks on the disk medium 11 on which spiral servo information is recorded, and thereby achieves head positioning control (seek operation and track-following operation) having the same access performance as in the case of using concentric servo information. Therefore, consequently, the efficiency of the random access to concentric data tracks is improved.

According to the embodiment, it is possible to provide a magnetic disk apparatus which efficiently performs head positioning control to concentric data tracks by using spiral servo information. Therefore, the efficiency of the random access to concentric data tracks is improved by using spiral servo information.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a disk medium having a disk surface on which a plurality of servo sectors are radially arranged in a radial direction of the disk surface at regular intervals and concentric data tracks are formed, the servo sectors defining a spiral servo track and storing servo information and the concentric data tracks storing user data;
a head which reads the servo information and reads/writes the user data on the disk medium; and
a controller which performs positioning control of the head based on the servo information read by the head, the controller generating virtual servo information having assumed virtual track center lines corresponding to center lines of the data tracks based on the servo information, and positioning the head to a target data track based on the virtual servo information.

2. The disk drive according to claim 1, wherein the controller:
calculates a position error of the head from a center line of the servo track, based on the position information included in the servo information read from the servo sectors by the head;
calculates a correction value of the position error with respect to the virtual track center lines; and
calculates, as the virtual servo information, position information corresponding to the virtual track center lines by using the correction value.

3. The disk drive according to claim 1, wherein the controller:
calculates a position error of the head from a center line of the servo track, based on the position information included in the servo information read from the servo sectors by the head;
calculates a correction value of the position error with respect to the virtual track center lines;
calculates, as the virtual servo information, position information corresponding to the virtual track center lines by using the correction value; and
moves the head to the target track by using the virtual servo information, in seek operation included in the positioning control of the head.

4. The disk drive according to claim 1, wherein the controller compares a cylinder prediction value obtained by predicting a cylinder number corresponding to one of the servo sectors based on a sector number read from said one of the servo sectors by the head, with an actual cylinder number read from said one of the servo sectors by the head, and performs error decision when the cylinder prediction value does not agree with the actual cylinder number as a result of comparison.

5. The disk drive according to claim 1, wherein the controller:
calculates a position error of the head from a center line of the servo track, based on the position information included in the servo information read from the servo sectors by the head;
calculates a correction value of the position error with respect to the virtual track center lines;
calculates, as the virtual servo information, position information corresponding to the virtual track center lines by using the correction value; and
performs a track following operation by using the virtual servo information in the track following operation to position the head to a center line of the virtual target data track in the positioning control of the head.

6. The disk drive according to claim 1, wherein
the controller performs predetermined error processing, when it is impossible to position the head onto the center line of the target data track by using the virtual servo information.

7. A method of head positioning control in a disk drive including a disk medium having a disk surface on which a plurality of servo sectors are radially arranged in a radial direction of the disk surface at regular intervals and concentric data tracks are formed, the servo sectors defining a spiral servo track and storing servo information and the concentric data tracks storing user data, and a head which reads the servo information and reads/writes the user data on the disk medium, the method comprising:
reproducing the servo information by reading the servo information by the head;
generating virtual servo information having assumed track center lines corresponding to center lines of the data tracks; and
positioning the head to a target data track based on the virtual servo information.

8. The method according to claim 7, wherein the generating the virtual servo information includes:
calculating a position error of the head from a center line of the servo track, based on the position information included in the servo information read from the servo sectors by the head;
calculating a correction value of the position error with respect to the virtual track center lines; and
calculating, as the virtual servo information, position information corresponding to the virtual track center lines by using the correction value.

9. The method according to claim 7, wherein the positioning the head includes:
moving the head to the target track by using the virtual servo information, in seek operation included in the positioning control of the head.

10. The method according to claim 7, wherein the positioning the head includes:
performing a track following operation by using the virtual servo information in the track following operation to position the head to a center line of the virtual target data track in the positioning control of the head.

* * * * *